Aug. 17, 1965   B. E. THOUVENELLE ETAL   3,200,977
LOADING AND UNLOADING DEVICE FOR SECURING
TRUCK TRAILERS UPON CARRYING VEHICLES
Filed April 14, 1964                                   8 Sheets-Sheet 1
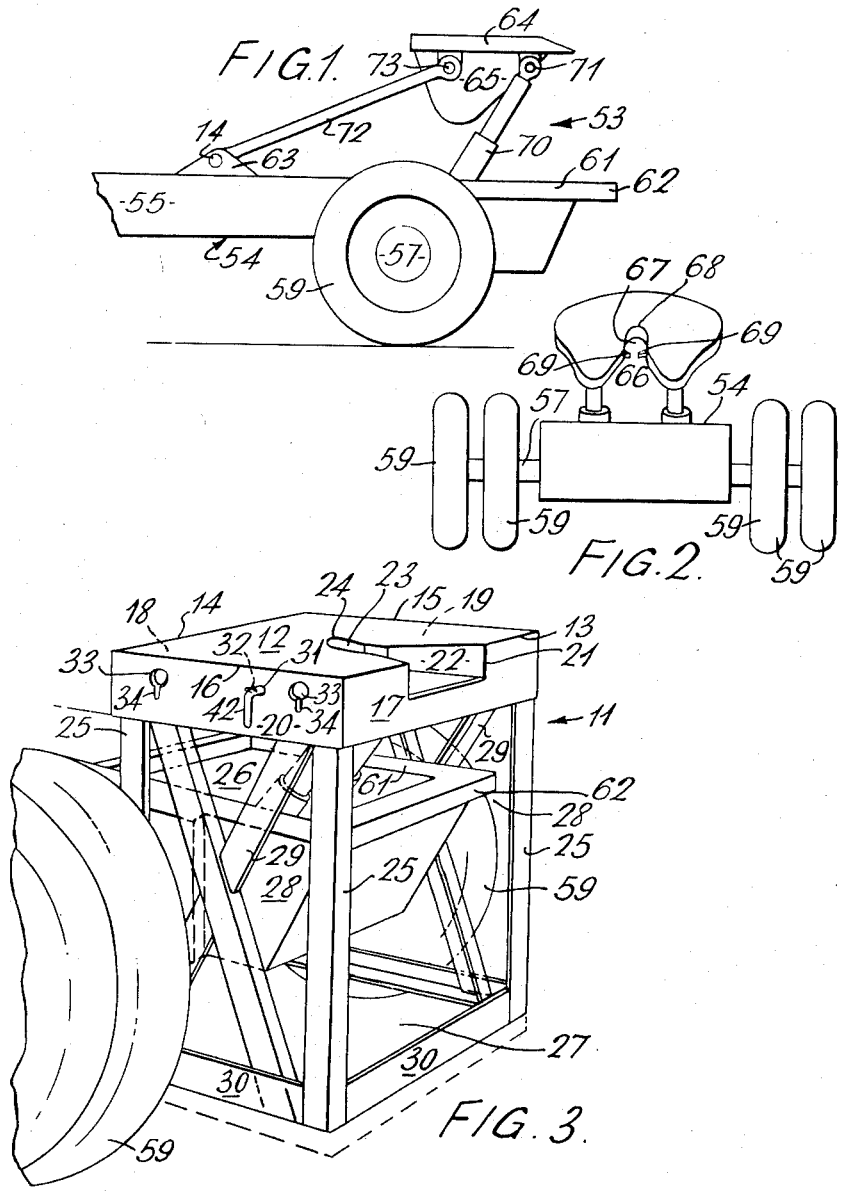
INVENTORS
BERYL E. THOUVENELLE
WILLIAM H. STRINGER
C. GORDON ANDERSON
BY
ATTORNEY

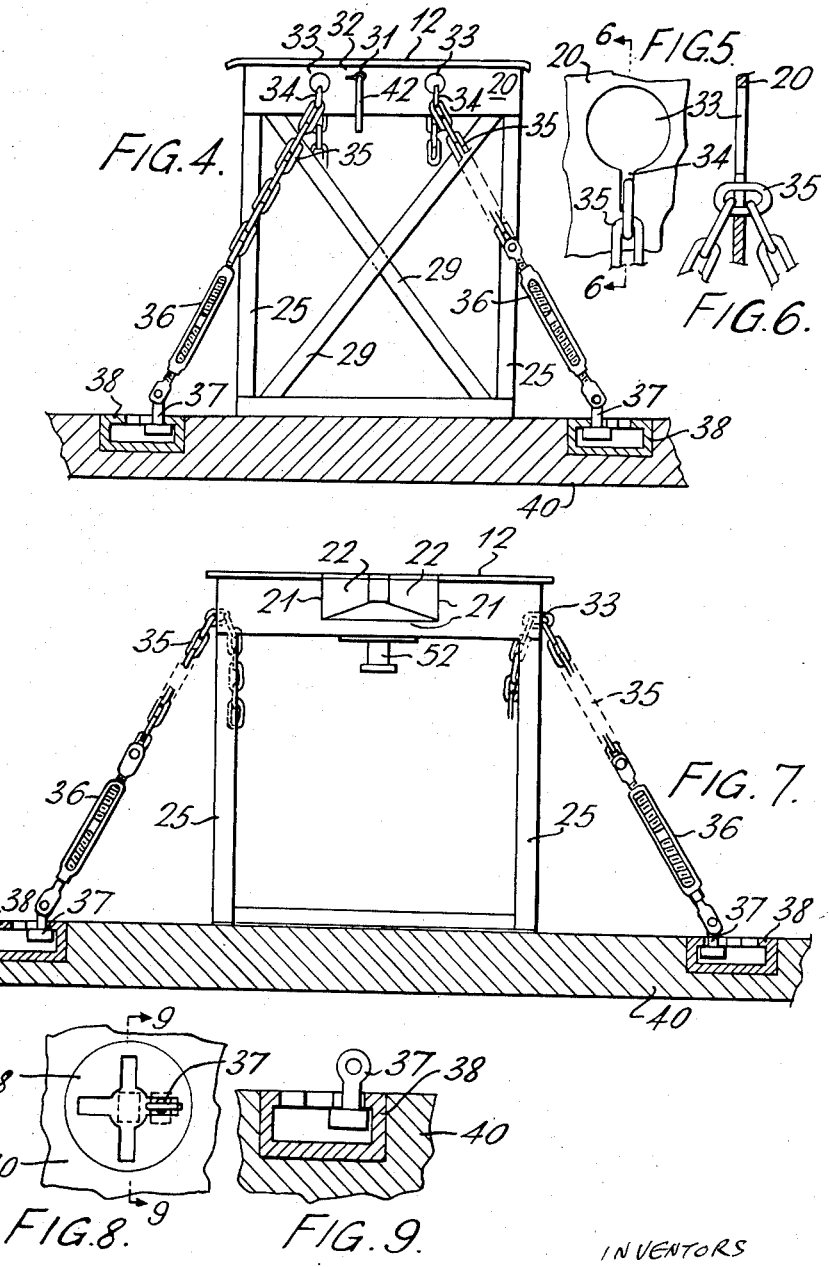

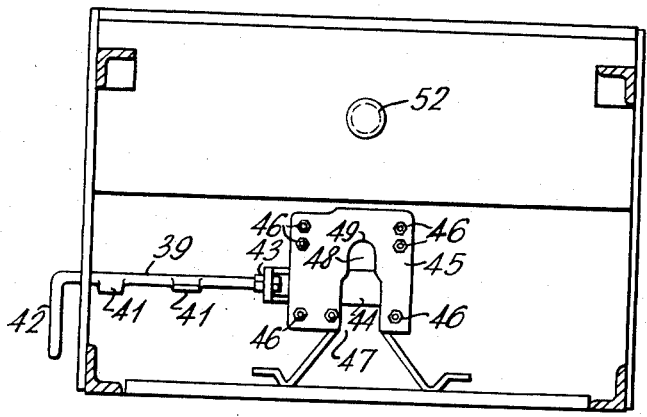
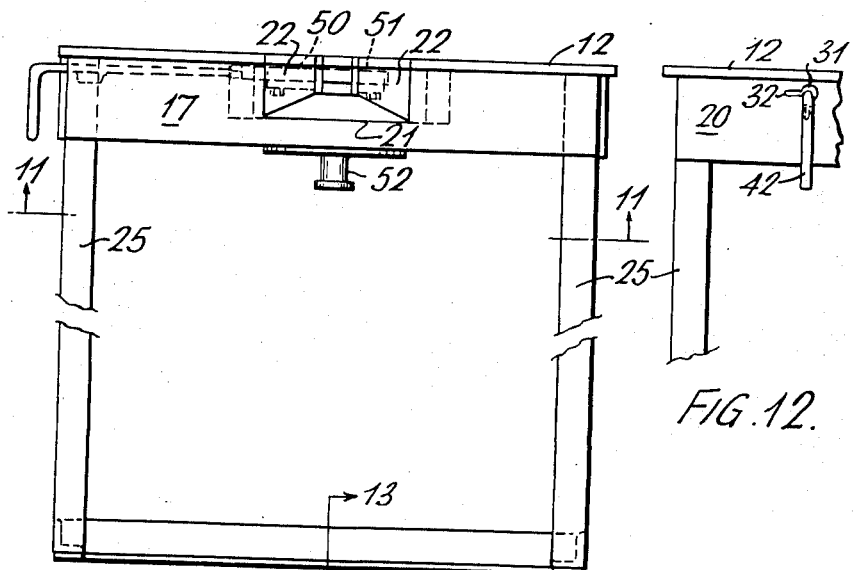
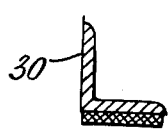

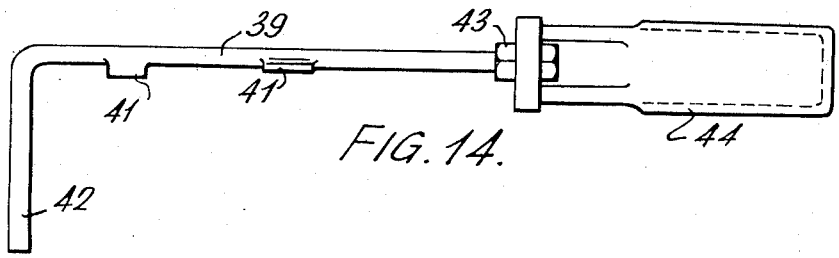
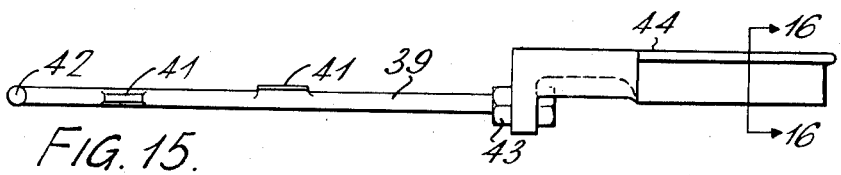
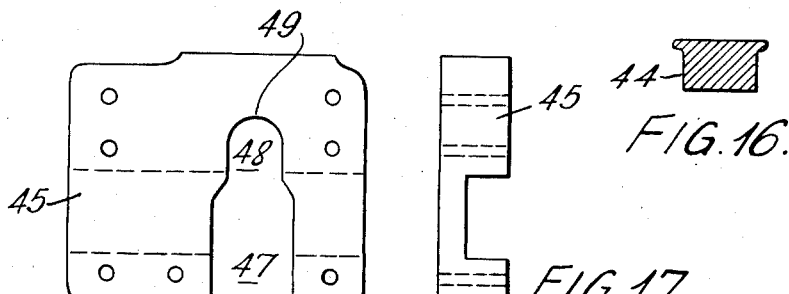
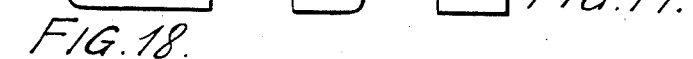
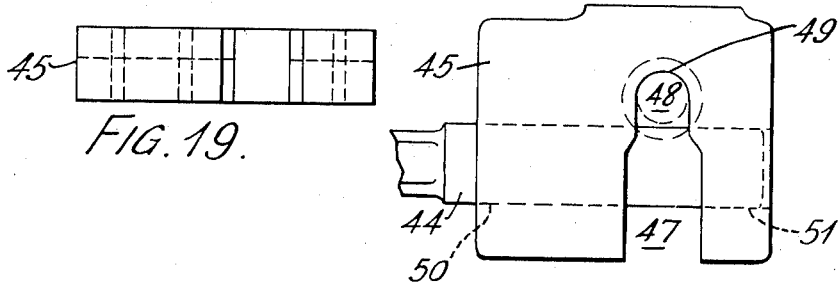

Aug. 17, 1965 B. E. THOUVENELLE ETAL 3,200,977
LOADING AND UNLOADING DEVICE FOR SECURING
TRUCK TRAILERS UPON CARRYING VEHICLES
Filed April 14, 1964 8 Sheets-Sheet 5
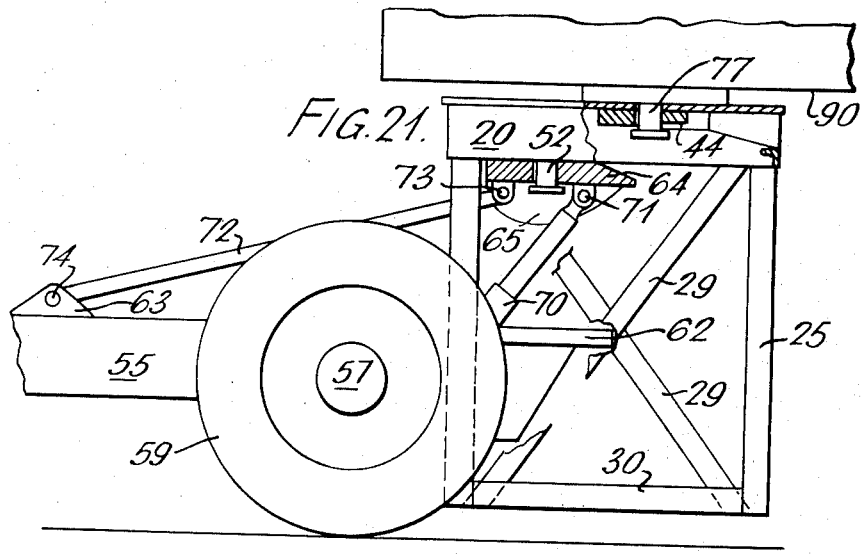
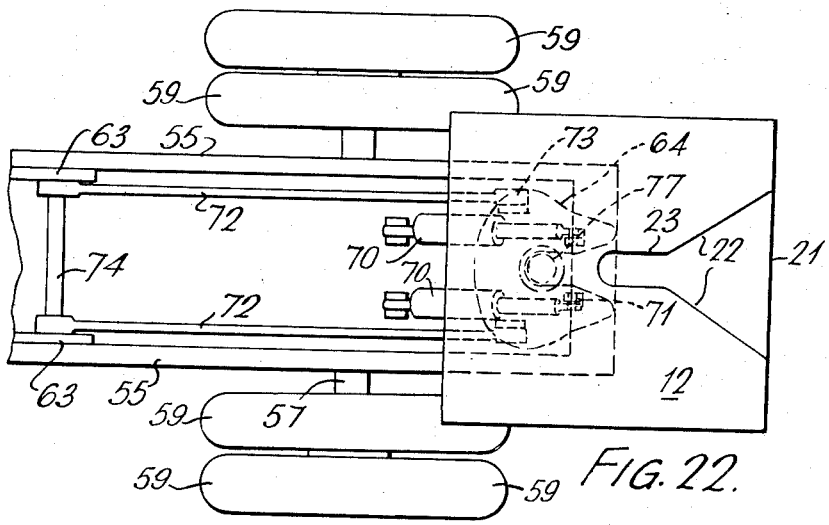
INVENTORS
BERYL E. THOUVENELLE
WILLIAM H. STRINGER
C. GORDON ANDERSON
BY J. Walton Bach
ATTORNEY

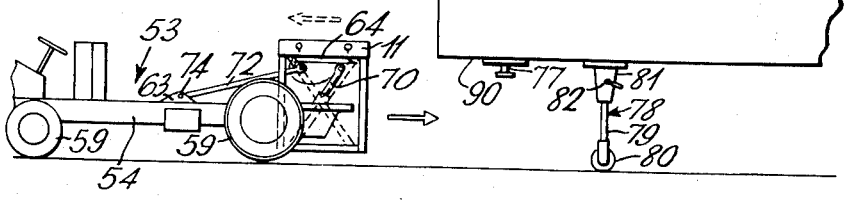
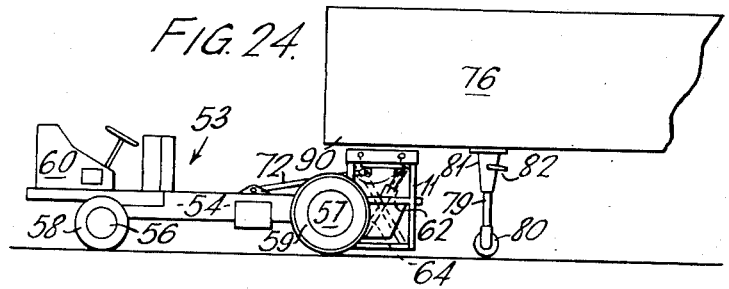
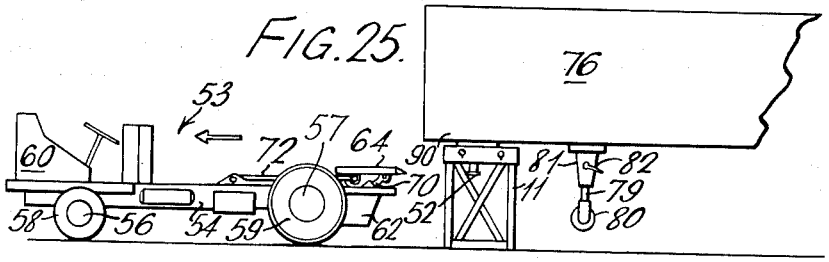

Aug. 17, 1965 B. E. THOUVENELLE ETAL 3,200,977
LOADING AND UNLOADING DEVICE FOR SECURING
TRUCK TRAILERS UPON CARRYING VEHICLES
Filed April 14, 1964 8 Sheets-Sheet 7

INVENTORS
BERYL E. THOUVENELLE
WILLIAM H. STRINGER
C. GORDON ANDERSON
BY J. Walk Bank
ATTORNEY

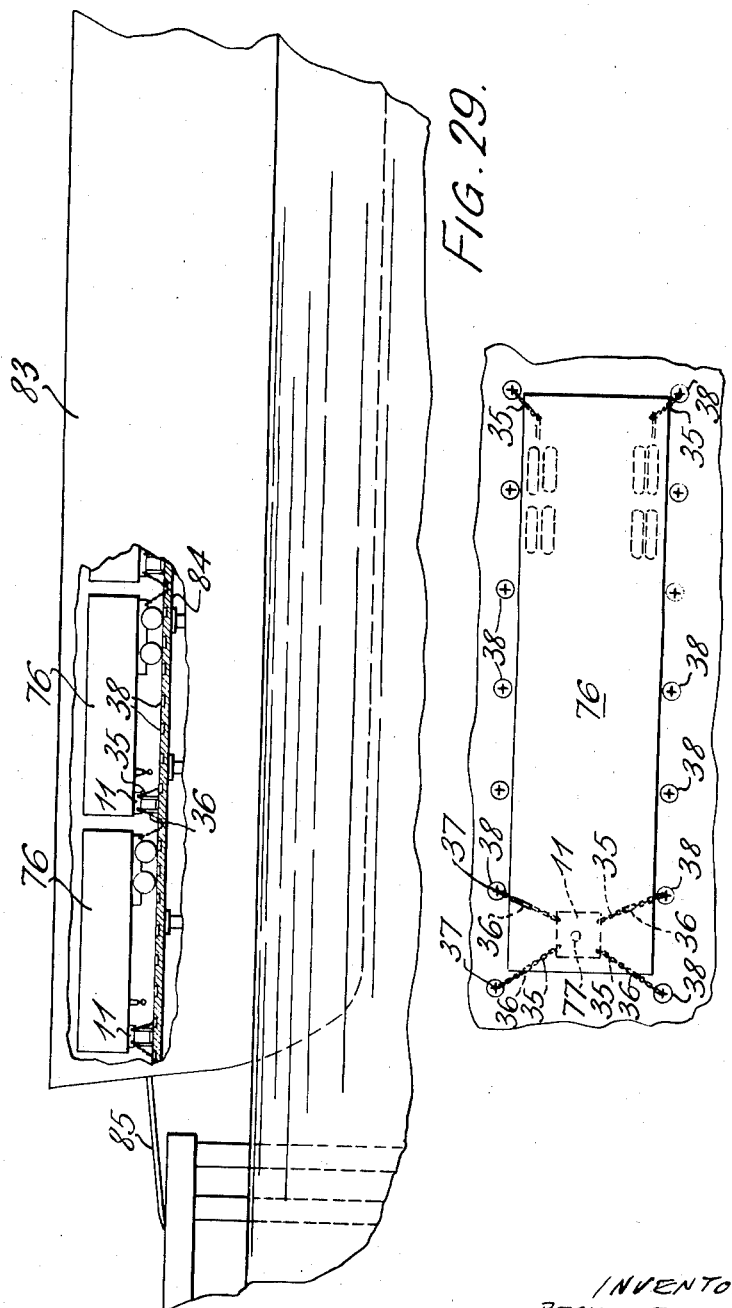

United States Patent Office 3,200,977
Patented Aug. 17, 1965

3,200,977
LOADING AND UNLOADING DEVICE FOR SECURING TRUCK TRAILERS UPON CARRYING VEHICLES
Beryl E. Thouvenelle, 4005 San Amaro Drive, Coral Gables, Fla.; William H. Stringer, 2556 Stein St., Jacksonville, Fla.; and C Gordon Anderson, 1415 Sevilla Ave., Coral Gables, Fla.
Filed Apr. 14, 1964, Ser. No. 359,670
5 Claims. (Cl. 214—515)

This invention relates to a loading and unloading device for securing truck trailers upon carrying vehicles. The device of this invention may be utilized in connection with the securing support for truck trailers which is disclosed in a co-pending application. The device of this invention and the securing support are also utilized in connection with the method of loading, unloading and securing truck trailers upon carrying vehicles which is disclosed in still another co-pending application. Still another co-pending application including structure disclosed and not claimed in this application is entitled Securing Device for Truck Trailers Upon Ships. The co-pending applications disclosing structure which is not specifically claimed in this application are entitled Securing Support for Truck Trailers, Serial No. 359,747, filed Apr. 14, 1964; Method of Loading, Unloading and Securing Truck Trailers Upon Carrying Vehicles, Serial No. 354,972, filed Mar. 26, 1964; and Securing Device for Truck Trailers Upon Ships, Serial No. 359,746, filed Apr. 14, 1964. The instant application and the claims thereof are directed specifically to the device claimed in this application.

When the loading and unloading device of this invention, as will be set forth subsequently in this specification, is utilized in connection with the structures and methods described in the co-pending applications, the combination provides a simple, foolproof and inexpensive method of transporting goods.

As is well-known by those skilled in this art, including the reader of this specification, transportation of manufactured goods has become almost exclusively the province of truck trailers. In order to properly take advantage of other means of bulk transport such as railway cars and ships it has become standard practice to "piggy-back" truck trailers on railway flat cars or "fishy-back" truck trailers upon ships. The truck trailers are loaded on the supplementary vehicle, carried close to their ultimate destination by bulk transport such as a railway train or a ship, and thereafter are separately driven to their ultimate destinations.

In loading and unloading such truck trailers conventional practice has been to haul the trailer by tractor to its location on the railway car or ship, thereafter raise the tractor so as to lift the trailer above its usual height, crank down the "landing gear" and then remove the tractor. In unloading the trailer the tractor is raised to the height of the trailer assumed by the position of the landing gear, the tractor is attached to the trailer, the landing gear is moved upwardly so as to clear the ground, and the tractor pulls the trailer to its new location.

In the utilization of this conventional method shippers have found a large number of claims for damaged goods accruing. The "landing gear" of a trailer are relatively weak and the jolting of the auxiliary vehicle causes the landing gear, in many cases, to collapse. Shippers have attempted to avoid this difficulty by utilizing auxiliary supports underneath the forward portion of the truck trailer. Mounting of these auxiliary supports has been a difficult and dangerous job which has caused injury to a number of transportation workers.

By utilizing the device claimed in this specification together with the other equipment claimed in the co-pending applications all of the prior difficulties are obviated. The device of this invention permits the support disclosed in the copending application to be quickly and easily attached to the truck trailer. The support and trailer combination can then be hauled by the device to the position that the trailer is to assume on the carrying vehicle. The device of this invention can then be removed and the support left in position during the journey. At this point the support acts to protect the goods within the trailer from damage and prevents untoward movement of such trailer. When the carrying vehicle reaches the end of its journey the support can be quickly and easily removed utilizing the device of this invention and the trailer hauled to its ultimate destination by the normal tractor.

The above constitutes a brief description of the instant invention and some of the advantages thereof. Other objects and advantages will become apparent to the reader of this specification as the description proceeds.

The invention will now be described by reference to the accompanying drawings which are made a part of this specification and which represent the best mode known to the inventors of taking advantage of their invention.

FIG. 1 is a fragmentary side view of a portion of the loading and unloading device of this invention for securing truck trailers upon carrying vehicles.

FIG. 2 is a rear view of the device shown in FIG. 1.

FIG. 3 is a perspective view of a portion of the device shown in FIG. 1 with the securing support of this invention disposed above the elevatable support member of the device shown in FIG. 1. In this figure the slidably movable securing member and the openings adapted to accommodate holding supports have been removed for clarity of illustration.

Figure 26:
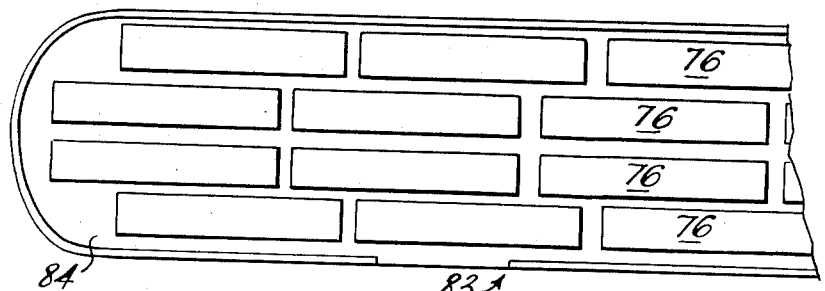

FIG. 4 is a side view of the support device. In this view the support device is shown in its secured position upon a carrying vehicle. The holding supports utilized to secure the support device to the carrying vehicle are also shown.

FIG. 5 is a fragmentary detail view, on an enlarged scale, of the manner in which one type of holding support may be secured to the support device.

FIG. 6 is a detail sectional view, on the same scale as that of FIG. 5, taken along lines 6—6 of FIG. 5.

FIG. 7 is a front view of the support device also shown in secured position on a carrying vehicle with the holding supports utilized in connection therewith in position.

FIG. 8 is a plan view of one form of means which may be utilized to secure one end of the holding supports to the carrying vehicle.

FIG. 9 is a sectional view taken along lines 9—9 of FIG. 8.

FIG. 10 is a front view, on a slightly enlarged scale, of the support device. In this figure the slidably movable securing member which is adapted to secure the kingpin of a truck trailer in position on the device is shown in engaged position.

FIG. 11 is a sectional view of the device shown in FIG. 10 taken along lines 11—11 of FIG. 10.

FIG. 12 is a fragmentary side view of the form of device shown in FIG. 10.

FIG. 13 is a sectional view of the form of device shown in FIG. 10 taken along lines 13—13 of FIG. 10.

FIG. 14 is a detail plan view, on an enlarged scale, of the slidably movable securing member, the arm member and the stop means thereupon which is utilized upon the support device.

FIG. 15 is a side view, on the same scale as that of FIG. 14 and of the structure shown in FIG. 14.

FIG. 16 is a sectional view of the structure shown in FIG. 15 taken along lines 16—16 of FIG. 15.

FIG. 17 is a side detail view, on an enlarged scale, of the block member of the support device.

FIG. 18 is a bottom plan view, on the same scale as that of FIG. 17, of the block member of the support device.

FIG. 19 is a front view of the block member of the support device on the same scale as that of FIGS. 17 and 18.

FIG. 20 is a detail plan view showing the manner in which the slidably movable securing member demountably retains the kingpin of a truck trailer in position upon the support device.

FIG. 21 is a side view, partly in section, showing the manner in which the support device is secured to the kingpin of a truck trailer and the loading and unloading device is secured to the said support device so as to move both the truck trailer and the support device on and off of a carrying vehicle.

FIG. 22 is a bottom plan view of the manner in which the support device may be moved by means of the loading and unloading device of this invention. In this figure some of the detailed structure of the support device has been omitted for clarity of illustration.

FIG. 23 is a somewhat diagrammatic side view of the manner in which the support device may be moved into position beneath a truck trailer.

FIG. 24 is a view similar to that of FIG. 23 but showing the support device in position beneath a truck trailer.

FIG. 25 is a view similar to that of FIG. 24 but showing the support device secured to a truck trailer and resting upon the floor of the carrying vehicle with the weight of the truck trailer now resting upon the support.

FIG. 26 is a diagrammatic representation of the manner in which a plurality of truck trailers are placed upon a carrying vehicle (in this case a ship). The truck trailers are shown in plan.

Figure 27:
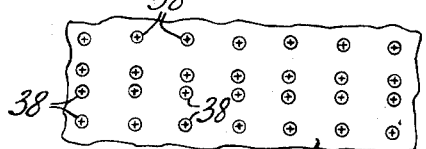

FIG. 27 is a diagrammatic view of the manner in which holding supports are placed upon the deck of the ship shown in FIG. 26.

Figure 28:
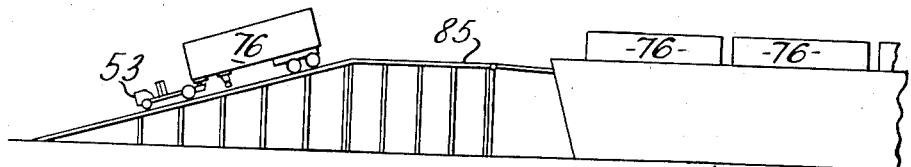

FIG. 28 is a diagrammatic view showing the manner in which a truck trailer may be loaded upon a carrying vehicle. In this figure the support is not shown.

FIG. 29 is a diagrammatic view of a plurality of truck trailers in position upon a carrying vehicle and in condition to be transported to their destination. The supports are shown in secured position to the deck of the carrying vehicle.

FIG. 30 is a diagrammatic plan view of the manner in which the truck trailer and the support may be secured to the carrying vehicle during the journey of the carrying vehicle to its destination.

The invention will now be specifically described by reference to the specific form thereof shown in the accompanying drawings. In this connection, however, the reader is cautioned to note that the specific form shown is for illustrative purposes and for purposes of example only. Various changes and modifications may obviously be made within the spirit and scope of this invention. The scope of this invention is to be determined by the appended claims.

A support device 11 is formed with a substantially rectangular platform 12 having a front edge 13, a rear edge 14 and a pair of intermediate edges 15 and 16. Portion 17 downwardly depends from edge 13; portion 18 downwardly depends from edge 14; portion 19 downwardly depends from edge 15 and portion 20 downwardly depends from edge 16. Downwardly depending portion 17 is provided with a cut-out portion 21 therewithin.

A first inwardly tapering lateral recess 22 is provided within platform 12. Recess 22 extends from cut-out portion 21 to second recess 23. Second recess 23 also extends inwardly from first recess 22. Recess 23 has an arcuate inner face. Recess 23 is adapted to removably accommodate the kingpin of a truck trailer as will be subsequently explained.

Support 11 is also formed with a plurality of downwardly depending legs which depend from each corner of platform 12. Legs 25 define a front space 26, a rear space 27 and a plurality of side spaces 28. An X-member 29 is disposed within spaces 28 and extend across opposite legs 25 which define spaces 28. A base member 30 underlies and extends across legs 25 which define rear space 27 and side spaces 28.

Portion 20 downwardly depending from platform 12 is provided with an opening 31 therewithin. Opening 31 also bears adjacent slot 32.

Member 20 is also provided with additional openings 33 which are spaced from openings 31–32 on opposite sides thereof. Each of openings 33 is also provided with a downwardly depending slot 34 which is adapted to accommodate a portion of a chain 35 which constitutes a portion of the holding supports which secure device 11 to the floor 40 of the carrying vehicle. Each of chains 35 is connected to a turn buckle 36 which in turn is connected to a locking member 37. Member 37 is disposed within supports 38 which are secured to floor 40 of the carrying vehicle.

Member 19 is also provided with openings 33–34 therewithin which are preferably opposite openings 33–34 upon member 20. These openings are also adapted to support similar chains 35, turn buckles 36, members 37.

An arm member 39 is provided with a pair of extending key portions 41 thereupon and with an offset portion 42. Offset portion 42 is disposed outside openings 31–32. An end portion 43 of arm 39 is secured to slidably movable securing member 44. Block member 45 is secured beneath platform 12 by screws 46.

Block member 45 is provided with an inwardly extending lateral recess 47 and a second inwardly extending lateral recess 48 abutting recess 47. Recess 48 is provided with an arcuate rear face 49. Recesses 47 and 48 are in registration with recesses 22 and 23 of platform 12.

Block member 45 is also provided with additional recesses 50 and 51 which are disposed on opposite sides of recess 47. Member 44 is slidably movable within recesses 50 and 51 and is withdrawable and extendable across recess 47. Thus the structure permits securing of the kingpin of a truck trailer in position as will be subsequently explained.

Downwardly depending pin member 52 is also provided upon platform 12 and is spaced forwardly from block 45. Pin member 52 may be secured to the device of this invention as will be subsequently explained.

This loading and unloading device 53 is formed with a chassis 54 having a pair of side rails 55 thereupon. Front axle means 56 and rear axle means 57 are mounted upon chassis 54. A pair of spaced front wheels 58 and a pair of spaced rear wheels 59 are carried by the respective axles. A motor 60 is mounted forwardly upon chassis 54 and is operatively connected to rear wheels 59.

Chassis 54 is also provided with an end portion 61 which projects rearwardly beyond rear wheels 59 and is also formed with a rear end portion 62.

A first pair of spaced supports 63 is mounted forward of rear wheels 59.

An elevatable pivotally movable support member 64 is provided above and between rear wheels 59 and projecting rearwardly therefrom. Support 64 is also forward of rear end 62 of projecting portion 61.

Elevatable support member 64 is formed with a downwardly depending portion 65 and is also provided with a first laterally inwardly extending and inwardly tapering recess 66 and a second inwardly extending recess 67 adjacent recess 66. The rear face of recess 67, 68, is arcuate in form.

Releasable kingpin securing means 69, of conventional type, are operatively connected with recess 67 so that a kingpin of a truck trailer may be demountably and selectively retained within recess 67.

A pair of spaced telescoping members 70 are also provided. Telescoping members 70 are pivotally connected between rails 55 of chassis 54 and are also pivotally connected to downwardly depending member 65 at 71. An arm 72 is also connected to downwardly depending member 65 at 73 forward of connection point 71. Arm 72 is also pivotally connected to member 63 at 74.

A truck trailer 76 is of conventional construction having a kingpin 77 at its forward end thereof and a pair of landing gear 78 disposed behind kingpin 77. Landing gear 78 consists of a spaced pair of extensible members 79 each bearing a wheel 80 at their lower portion thereof and a support member 81 which permits members 79 to be extended and retracted within member 81. Control means 82 are also provided to retain members 79 in a fixed position.

A carrying vehicle 83 (in this case a ship) is formed with a plurality of decks 84 and loading means 85 adjacent thereto.

With the foregoing specific description the operation of this invention and the inventions described in the co-pending applications will now be explained.

In explaining the operation of this invention the reader is cautioned to note that the series of method steps set forth herein may be varied without departing from the method required to utilize this invention. The sequence of method steps given herein are the preferred sequence of steps.

A conventional truck trailer such as truck trailer 76 is transported by a conventional tractor attached to kingpin 77 with wheels 80 of landing gear 78 in up position. The trailer is then placed in the marshalling yard adjacent the carrying vehicle.

The forward end 90 of the truck trailer is raised. This can be accomplished quickly and expeditiously by attaching elevatable member 64 to kingpin 77 specifically by disposing kingpin 77 within recess 67 and actuating locking means 69. Elevatable member 64 is then raised by applying hydraulic, air, or other lifting means in impinging relationship with telescoping member 70.

Support 79 is then moved downwardly toward the ground in the direction of the arrow shown in FIG. 23. This can be done by moving handle 82 which is ratchetly connected with support 79. Since a plurality of supports 79 are present on either side of trailer 76 they may either be operated independently or together depending upon the landing gear utilized in the particular truck trailer. The landing gear mechanism is, of course, conventional in truck trailers.

With the landing gear in the position shown in FIG. 23 elevatable member 64 is disengaged from kingpin 77 and the device 53 is moved away from trailer 76. Support 11 is now utilized. Arm member 39 is moved to its most outward position so that member 44 is clear of recesses 47 and 48. Device 53 is then placed in the position wherein elevatable member 64 is in lateral alignment with pin 52. Device 53 is then backed into support 11 until member 52 of support 11 enters recess 67 within elevatable support 64. Interlockable means 69 are then actuated.

It is noted that in this position elevatable support 64 underlies platform 12 and portions 61 and 62 of chassis 54 are disposed within support 11.

Elevatable support 64 is now raised so as to place recesses 47 and 48 in lateral alignment with kingpin 77 of truck trailer 76. Device 53 now carrying support 11 in elevated relationship is now moved backwardly as shown in FIGS. 23 and 24 until kingpin 77 of truck trailer 76 enters recess 48. Arm member 39 is then moved inwardly and locked in position so that member 44 extends across recesses 47 and 48 and thus secures kingpin 77 of truck trailer 76 in position.

The landing gear of the trailer is then raised to the "up" position with the wheels 80 of the landing gear assuming the position shown in FIG. 25.

The entire assembly is then moved by the use of device 53 to the position that it will assume on the carrying vehicle. When the truck trailer is placed in this position elevatable support 64 is moved downwardly until support 11 contacts the floor or deck of the carrying vehicle. At this point mechanism 69 is released and device 53 removed from the assembly. Chain members 35 are then disposed within recesses 33–34 and members 37 disposed within supports 38 so as to secure support 11 to the floor or deck of the carrying vehicle.

In addition, for better security, additional chain members 35 may be utilized to secure the rear portion of the truck trailer in position as shown in FIG. 30.

After the carrying vehicle has completed its voyage chain members 35 are demounted from support 11 and elevatable support 64 is brought into interlocking relationship with pin 52 of support 11 so that pin 52 again enters recess 67. Mechanism 69 is then engaged and elevatable support 64 raised. The entire assembly is then removed from the carrying vehicle to the marshalling yard where wheels 80 of landing gear 78 are then placed in contact with the ground. Arm member 39 is then moved to its most outward position so as to clear member 44 from its positions across recesses 47 and 48. Device 53 then removes support 11 from trailer 76 in the direction of the dotted arrow shown in FIG. 23. A conventional tractor can then be secured to kingpin 77 of trailer 76, wheels 80 of landing gear 78 cranked into "up" position, and the tractor and trailer moved to its ultimate destination.

The foregoing description sets forth the manner in which the objects of this invention are achieved.

We claim:

1. A loading and unloading device for placing truck trailers upon carrying vehicles comprising a chassis, a motor mounted thereupon, front axle means and rear axle means mounted beneath said chassis, a pair of spaced wheels mounted upon each of said axles, said motor being operatively connected to said rear wheels, said chassis also having an end portion projecting rearwardly beyond said rear wheels and having a rear end, a first support upon said chassis forward of said rear wheels, a pivotally movable and elevatable support member above and between said rear wheels and forward of the rear end of said projecting portion, said support member provided with a first laterally inwardly extending and inwardly tapering recess and a second inwardly extending recess adjacent said first recess, said second recess having an arcuate inner face and adapted to removably accommodate the kingpin of a truck trailer, a rearwardly inclined telescoping member between said rear wheels pivotally connected to said chassis and to said elevatable support and extending therebetween, means for extending and retracting said telescoping member, and a pivotally movable arm member connected to said elevatable member forward of the connection of said telescoping member and also pivotally connected to said first support upon said chassis, and releasable kingpin securing means operatively connected with said second recess within said elevatable support.

2. A loading and unloading device for placing truck trailers upon carrying vehicles comprising a chassis having spaced side members thereupon, a motor mounted forwardly thereupon, front axle means and rear axle means mounted beneath said chassis, a pair of spaced wheels mounted upon each of said axles, said motor being operatively connected to said rear wheels, said chassis also having an end portion projecting rearwardly beyond said rear wheels and having a rear end, a first pair of spaced supports forward of said rear wheels and upon said side members, a pivotally movable and elevatable support member above and between said rear wheels and forward of the rear end of said projecting portion, said elevatable support member having a downwardly depending portion thereupon and provided with a first laterally inwardly extending and inwardly tapering recess and a second inwardly extending recess adjacent said first recess, said second recess having an arcuate inner face and adapted to removably accommodate the kingpin of a truck trailer, a plurality of spaced rearwardly inclined telescoping members between said rear wheels, said telescoping members being pivotally connected to said chassis and to said downwardly depending member and extending therebetween, means for extending and retracting said telescoping members, and a pair of spaced pivotally movable members connected to opposite sides of said downwardly depending member forward of the connection of said telescoping members, each of said arm members being also pivotally connected to a first support upon said chassis, and releasable kingpin securing means operatively connected with said second recess within said elevatable support.

3. A loading and unloading device for placing truck trailers upon carrying vehicles comprising a chassis having spaced side members thereupon, a motor mounted forwardly thereupon, front axle means and rear axle means mounted beneath said chassis, a pair of spaced wheels mounted upon each of said axles, said motor being operatively connected to said rear wheels, said chassis also having an end portion projecting rearwardly beyond said rear wheels and having a rear end, a first pair of spaced supports forward of said rear wheels and upon said side members, a pivotally movable and elevatable support member above and between said rear wheels and forward of the rear end of said projecting portion, said elevatable support member having a downwardly depending portion thereupon and provided with a first laterally inwardly extending and inwardly tapering recess and a second inwardly extending recess adjacent said first recess, said second recess having an arcuate inner face and adapted to removably accommodate the kingpin of a truck trailer, a plurality of spaced rearwardly inclined telescoping members between said rear wheels, said telescoping members being pivotally connected to said chassis and to said downwardly depending member and extending therebetween, means for extending and retracting said telescoping members, and a pair of spaced pivotally movable members connected to opposite sides of said downwardly depending member forward of the connection of said telescoping members, each of said arm members being also pivotally connected to a first support upon said chassis, and releasable kingpin securing means operatively connected with said second recess within said elevatable support, a support device having a platform adapted to demountably overlie said elevatable support, a plurality of leg members depending from said platform, releasable vehicle holding means upon said platform, and device transporting means spaced from said vehicle holding means and adapted to be accommodated within the recesses within said elevatable support.

4. A loading and unloading device for placing truck trailers upon carrying vehicles comprising a chassis having spaced side rails thereupon, a motor mounted forwardly upon said chassis, front axle means and rear axle means mounted beneath said chassis, a pair of spaced wheels mounted upon each of said axle means, said motor being operatively connected to said rear wheels, said chassis also having an end portion projecting rearwardly beyond said rear wheels and having a rear end, a first pair of spaced supports forward of said rear wheels and upon said side members, a pivotally movable and elevatable support member above and between said rear wheels and forward of the rear end of said projecting portion, said elevatable support member having a downwardly depending portion thereupon and provided with a first laterally inwardly extending and inwardly tapering recess and a second inwardly extending recess adjacent said first recess, said second recess having an arcuate inner face and adapted to removably accommodate the kingpin of a truck trailer, a plurality of spaced rearwardly inclined telescoping members between said rear wheels, said telescoping members being pivotally connected to said chassis and to said downwardly depending member and extending therebetween, means for extending and retracting said telescoping members, a pair of spaced pivotally movable members connected to opposite sides of said downwardly depending member forward of the connection of said telescoping members, each of said arm members being also pivotally connected to a first support upon said chassis, releasable kingpin securing means operatively connected with said second recess within said elevatable support, a support device having a platform adapted to demountably overlie said elevatable support, said platform provided with an inwardly extending recess at one side thereof adapted to removably accommodate the kingpin of a truck trailer, releasable kingpin securing means operatively connected with said recess, a downwardly depending stand member connected to said platform, and a downwardly depending pin member upon said platform spaced from said recess, said pin member adapted to be removably accommodated within the second recess within said elevatable member.

5. A loading and unloading device for placing truck trailers upon carrying vehicles comprising a chassis, axle means mounted beneath said chassis, a pair of spaced wheels mounted upon said axle, said chassis also having an end portion projecting rearwardly beyond said wheels and having a rear end, support means upon said chassis forward of said wheels, a pivotally movable and elevatable support member above and between said wheels and forward of the rear end of said projecting portion, said support member provided with a laterally inwardly extending and inwardly tapering recess, said recess having an arcuate inner face adapted to removably accommodate the king pin of a truck trailer, a telescoping member between said wheels pivotally connected to said chassis and to said elevatable support and extending therebetween, means for extending and retracting said telescoping member, a pivotally movable arm connected to said elevatable member forward of the connection of said telescoping member and also pivotally connected to said support means upon said chassis, and releasable king pin securing means operatively connected with said second recess within said elevatable support.

References Cited by the Examiner
UNITED STATES PATENTS

| 2,637,453 | 5/53 | Cleveland | 214—38.8 X |
| 2,837,226 | 6/58 | Gutridge | 214—38.10 |
| 2,847,230 | 8/58 | Hendrickson et al. | 280—438 X |
| 3,057,499 | 10/62 | Dorkins | 214—38.10 X |
| 3,112,040 | 11/63 | Levitt et al. | 214—38.10 |

HUGO O. SCHULZ, Primary Examiner.

GERALD M. FORLENZA, Examiner.